US012280988B2

(12) United States Patent
Cox et al.

(10) Patent No.: US 12,280,988 B2
(45) Date of Patent: Apr. 22, 2025

(54) DETACHABLE BODY SECURING MECHANISM AND ASSOCIATED SYSTEMS AND METHODS

(71) Applicant: Wilian Holding Co., Des Moines, IA (US)

(72) Inventors: Evan Cox, Des Moines, IA (US); Thomas Waldschmitt, Ankeny, IA (US)

(73) Assignee: Wilian Holding Co., Des Moines, IA (US)

( * ) Notice: Subject to any disclaimer, the term of this patent is extended or adjusted under 35 U.S.C. 154(b) by 418 days.

(21) Appl. No.: 17/535,234

(22) Filed: Nov. 24, 2021

(65) Prior Publication Data
US 2022/0162042 A1    May 26, 2022

Related U.S. Application Data

(60) Provisional application No. 63/117,668, filed on Nov. 24, 2020.

(51) Int. Cl.
*B66C 1/42* (2006.01)
*B60P 1/64* (2006.01)

(52) U.S. Cl.
CPC ............ *B66C 1/425* (2013.01); *B60P 1/6463* (2013.01)

(58) Field of Classification Search
CPC ..... B60P 1/6463; B60P 1/6418; B60P 1/6427; B60P 1/6454; B60P 1/649; B60P 7/13; B66C 1/223; B66C 1/425; B66C 1/22
See application file for complete search history.

(56) References Cited

U.S. PATENT DOCUMENTS

| | | | | |
|---|---|---|---|---|
| 4,111,321 A | * | 9/1978 | Webster | ................ B60P 1/6463 414/539 |
| 5,131,673 A | * | 7/1992 | Gleeson | .................... B60P 7/13 296/35.3 |
| 5,601,393 A | | 2/1997 | Waldschmitt | |

(Continued)

OTHER PUBLICATIONS

Swaploader, "100 Series 35 5/8" Sub-Frame Critical Dimensions", www.swaploader.com, Jun. 15, 2020, 1-4.

(Continued)

*Primary Examiner* — Glenn F Myers
(74) *Attorney, Agent, or Firm* — Dentons Davis Brown; Kassandra Ricklefs

(57) ABSTRACT

A detachable body securing mechanism having first and second clamp arms that rotate toward the inside of longitudinal support members of a detachable body to clamp down on the longitudinal support members is disclosed. The first and second clamp arms are rotatably coupled to respective first and second ends of an elongated frame of the securing mechanism. The securing mechanism further includes an actuable piston with a piston body coupled to the first clamp arm and a piston coupled to the second clamp arm. In certain implementations, extension of the piston rotates the first and second clamp arms away from each other and the elongated frame into a clamping configuration for securing the detachable body. Retraction of the piston rotates the first and second clamp arms toward each other and the elongated frame into a retracted configuration for releasing the detachable body.

10 Claims, 9 Drawing Sheets

(56) References Cited

U.S. PATENT DOCUMENTS

| | | | |
|---|---|---|---|
| 6,253,460 B1* | 7/2001 | Schmitz | G01D 5/2013 |
| | | | 33/708 |
| 6,695,553 B1 | 2/2004 | Galbreath et al. | |
| 7,726,930 B2 | 6/2010 | Simpson et al. | |
| 8,109,550 B1* | 2/2012 | Benjamin | B66D 3/18 |
| | | | 294/67.31 |
| 10,919,433 B1* | 2/2021 | Lee | B60P 7/0892 |
| 11,383,630 B2 | 7/2022 | Cox et al. | |
| 2001/0046430 A1* | 11/2001 | Bayne | B65F 1/1452 |
| | | | 414/408 |
| 2002/0172583 A1* | 11/2002 | O'Daniel | B62D 33/08 |
| | | | 410/55 |
| 2005/0281651 A1 | 12/2005 | Simpson et al. | |
| 2008/0170925 A1* | 7/2008 | Marmur | B60P 7/13 |
| | | | 410/80 |
| 2018/0282974 A1* | 10/2018 | Kubo | F15B 13/01 |

OTHER PUBLICATIONS

Swaploader, "Hydraulic locking; Hydraulilukitus", LHT 260 A, Aug. 27, 2004, 1.

Swaploader, "Model SL-145; Parts and Operations Manual", www.swaploader.com, Jul. 2017, 1-99.

Swaploader, "Model SL-222; Parts and Operations Manual", www.swaploader.com, Jul. 2009, 1-111.

Swaploader, "Sub-Frame; Installation Instructions", www.swaploader.com, Mar. 2010, 1-2.

Swaploader, "SwapLoader Model SL-145 Hydraulic Hook lift Bid Specifications", Sep. 18, 2020, 1-3.

Swaploader, "The Hooker; Container Securment System", Galfab: Building on a Legacy—galfab.com, 1-2.

\* cited by examiner

DETACHABLE BODY SECURING MECHANISM AND ASSOCIATED SYSTEMS AND METHODS

CROSS-REFERENCE TO RELATED APPLICATION(S)

This application claims priority to U.S. Provisional Application No. 63/117,668 filed Nov. 24, 2020 and entitled "Detachable Body Securing Mechanism," which is hereby incorporated by reference in its entirety under 35 U.S.C. § 119(e).

FIELD

The various embodiments herein relate to hoists mounted on various types of vehicles for loading and unloading detachable containers and other types of detachable bodies.

BACKGROUND

Vehicle-mounted hoists are known to be useful for loading, transporting, and unloading a variety of containers and other detachable bodies, including flatbeds and vehicle-mounted equipment. Such hoists have long been used in the construction, landscaping, waste, municipal, shipping and multiple other industries. Two common types of vehicle-mounted hoists are cable hoists and hook-lift hoists. As is widely known, cable hoists use a winch and a cable to pull containers and other bodies onto the vehicle chassis. Hook-lift hoists have been in common use, particularly in European countries, for a number of years. The hook-lift hoist typically has a pivotable, hydraulically powered, L-shaped arm with a hook on its distal end portion or jib. The hook of the jib engages a loading bar of the detachable body and the arm is pivoted to lift the body onto the vehicle chassis.

Detachable containers and other detachable bodies typically include an understructure that is either part of the body or separately attached (e.g., welded) to the body underside. In some cases this kind of mounting structure is referred to as a sub-frame. A typical understructure includes multiple elongated cross members extending across the width of the body and at least two longitudinal support members running perpendicular to and supporting the cross members. In some cases the cross-support members are referred to as cross sills and the support members running the length of the body are called longsills.

Vehicle-mounted hoists also include mechanisms for securing the detachable body to the hoist. The securing mechanisms commonly include one mechanism that secures the front of the body (typically the hoist itself where it attaches to the body) and another mechanism that secures the rear of the body to the hoist. One rear securing mechanism that is commonly used includes passive integral slide-through body locks and corresponding body latch plates. The body latch plates are typically attached to the outer side of two longitudinal support members running underneath the length of the container or detachable body. As the hoist moves the body onto the hoist, each body latch plate engages a corresponding slide-through body lock mounted to the hoist chassis.

While the hook lift Industry has for the most part standardized the size/location of the loading bar at the front of the body that engages the jib, the latch plate size/location at the rear of the body will vary considerably depending on the manufacturer, as would be readily appreciated. There is a need in the art for improved, standardized mechanisms for securing detachable containers or other types of detachable bodies to vehicle-mounted hoists.

BRIEF SUMMARY

Discussed herein are various examples of a detachable body securing mechanism. In Example 1, the mechanism includes an elongated frame with first and second ends. First and second clamp arms are rotatably coupled to the respective first and second ends of the frame. An actuable piston has a piston body coupled to the first clamp arm and a piston coupled to the second clamp arm. Extension of the piston rotates the first and second clamp arms away from each other and the elongated frame into a clamping configuration for securing a detachable body. Retraction of the piston rotates the first and second clamp arms toward each other and the elongated frame into a retracted configuration for releasing the detachable body.

Example 2 relates to the securing mechanism according to Example 1, wherein the detachable body comprises an understructure comprising spaced apart first and second longitudinal support members, wherein in the clamping configuration the first clamp arm is configured to clamp against a top surface of the first longitudinal support member and the second clamp arm is configured to clamp against a top surface of the second longitudinal support member.

Example 3 relates to the securing mechanism according to Example 2, wherein the first clamp arm is configured to rotate into the clamping configuration by rotating toward the first longitudinal support member and away from the second longitudinal support member, and wherein the second clamp arm is configured to rotate into the clamping configuration by rotating toward the second longitudinal support member and away from the first longitudinal support member.

Example 4 relates to the securing mechanism according to Example 1, and further includes a first coupling link rotatably coupled between the first clamp arm and the piston body and a second coupling link rotatably coupled between the piston and the second clamp arm.

Example 5 relates to the securing mechanism according to Example 1, wherein the actuable piston comprises a load holding valve.

Example 6 relates to the securing mechanism according to Example 1, wherein the actuable piston comprises a proximity sensor.

Example 7 relates to the securing mechanism according to Example 1, wherein the actuable piston comprises a hydraulic cylinder comprising a piston and a cylinder body.

Example 8 relates to a vehicle-mounted hoist that includes the detachable body securing mechanism according to Example 1.

Example 9 relates to the vehicle-mounted hoist of Example 8 and further includes at least two rollers mounted to a hoist support structure, wherein the detachable body securing mechanism is mounted to the hoist support structure to the inside of the at least two rollers.

Example 10 relates to a detachable body securing system, comprising an elongated frame, a first clamp arm comprising an actuable piston and rotatably coupled to the elongated frame, and a second clamp arm comprising a piston coupled and rotatably coupled to the elongated frame, wherein: extension of the piston rotates the first and second clamp arms away from each other and the elongated frame into a clamping configuration for securing a detachable body, and retraction of the piston rotates the first and second clamp arms toward each other and the elongated frame into a retracted configuration for releasing the detachable body.

Example 11 relates to a vehicle-mounted hoist comprising a detachable body securing mechanism, the detachable body securing mechanism comprising: an elongated frame, a first clamp arm comprising an actuale piston and rotatably coupled to the elongated frame, and a second clamp arm comprising a piston coupled and rotatably coupled to the elongated frame.

Example 12 relates to the vehicle-mounted hoist of Example 11, wherein extension of the piston rotates the first and second clamp arms away from each other and the elongated frame into a clamping configuration for securing a detachable body.

Example 13 relates to the vehicle-mounted hoist of Example 11, wherein retraction of the piston rotates the first and second clamp arms toward each other and the elongated frame into a retracted configuration for releasing the detachable body.

While multiple embodiments are disclosed, still other embodiments will become apparent to those skilled in the art from the following detailed description, which shows and describes illustrative embodiments. As will be realized, the various implementations are capable of modifications in various obvious aspects, all without departing from the spirit and scope thereof. Accordingly, the drawings and detailed description are to be regarded as illustrative in nature and not restrictive.

DETAILED DESCRIPTION

Figure 1:
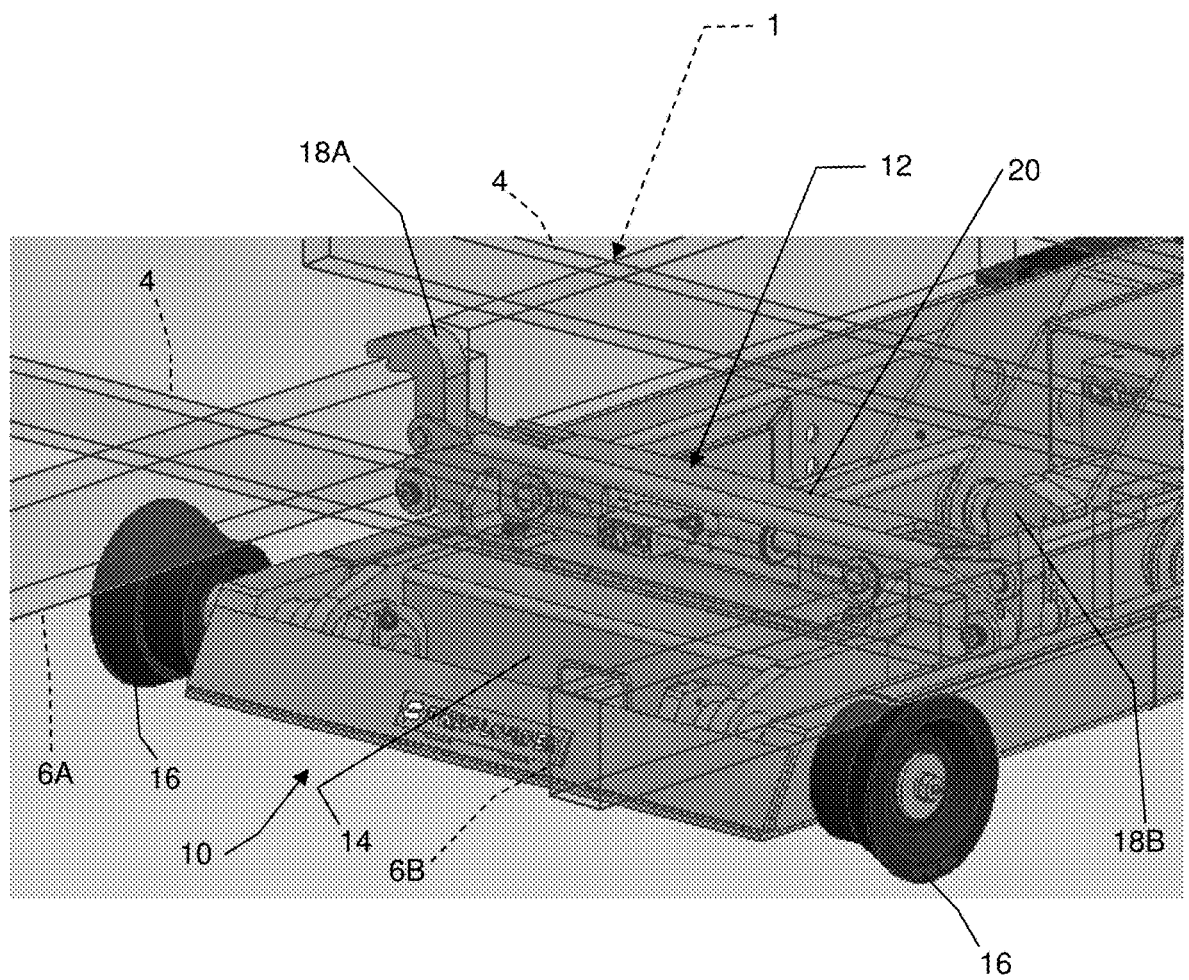
FIG. 1 is a partial perspective view of a hook-lift hoist with a detachable body securing mechanism securing the support structure of a detachable body according to an embodiment.

The various embodiments described herein relate to a securing mechanism configured to secure a detachable body upon a vehicle-mounted hoist. The securing mechanism includes powered clamp arms configured to clamp the understructure of a detachable body against the hoist, thereby securing the detachable body to the hoist and thus also to the vehicle. In various implementations the clamp arms are hydraulically powered. Further, in certain implementations the clamp arms are configured to clamp down upon longitudinal support members of the understructure of the detachable body. Longsills are one example of longitudinal support members. In certain implementations the clamp arms rotate in opposite directions toward the insides of respective longitudinal support members as the arms rotate into a clamping configuration. Rotating the arms away from the insides of the longitudinal members and toward each other disengages the clamping configuration in certain implementations.

As will be appreciated from an understanding of the present disclosure, aspects and features of various embodiments provide advantages over previously available detachable body securing mechanisms. In particular, clamping down from the top and inside of longitudinal support members can provide flexibility in accommodating varying configurations of support understructure and types of detachable bodies. As an example, the top-down clamping in various implementations of securing mechanisms can accommodate longitudinal support members of varying heights. This is an improvement over the slide-through body locks of some other body securing mechanisms that only accommodate body latch plates of a specific height. As another example, some implementations provide clamp arms having clamp surfaces with different heights, thus providing additional flexibility compared to previously available securing mechanisms. Further, rotating the clamp arms toward the insides of longitudinal support members can present fewer obstructions to the clamp arms from the surrounding environment than engaging the support members from the outside-in. Thus, various implementations of the disclosed securing mechanisms can advantageously secure multiple types and brands of detachable bodies which would otherwise only be compatible with specific securing mechanisms. It is understood that any embodiment herein can include any combination of the features and structures described above and elsewhere herein unless otherwise noted.

The term "detachable body" is used herein to refer to and include all types of various containers and other objects that can be loaded onto a vehicle using a vehicle-mounted hoist, such as a cable hoist or a lift-hook hoist. It is contemplated that a detachable body can be any type of container or vehicle-mounted equipment with an understructure or sub-frame compatible with implementations of the disclosed securing mechanisms. In certain implementations, a compatible body understructure or sub-frame includes at least two longitudinal support members that can be clamped by the securing mechanism. Examples of compatible understructure include, but are not limited to, spaced-apart longsills supporting one or more cross sills.

Examples of detachable bodies include different types of containers such as, for example, open-topped waste receptacles, shipping containers, security and storage containers, chipper containers, water tanks, and the like. Examples of detachable bodies also include different types of flatbeds and carriers, such as those for transporting vehicles and other wheeled equipment. Further examples of detachable bodies include various types of equipment mounted to a compatible understructure. Types of mounted equipment bodies include, but are not limited to, pumps, cranes, salt/sand spreaders, garbage packers, firefighting equipment, and numerous other types of equipment.

Turning to the drawings, FIG. 1 is a partial perspective view of a hook-lift hoist 10 with a detachable body securing mechanism 12 according to certain implementations. An understructure 1 of a detachable body is positioned upon the hoist 10 and depicted in outline for clarity. The understructure 1 is also referred to herein as a detachable body support structure 1. Although not shown, it will be appreciated that various types of containers and other detachable bodies may be mounted to the understructure 1. Further, the hook-lift hoist 10 is mountable to the chassis of vehicle, such as a truck, trailer or another vehicle having a wheeled chassis, as will be appreciated by those of skill in the art.

As shown in FIG. 1, the hook-lift hoist 10 includes a detachable body securing mechanism 12 mounted to the hoist support structure 14. In certain implementations the securing mechanism 12 is mounted to a portion of the hoist support structure 14 generally located to the inside of the hoist rollers 16, which also positions the securing mechanism 12 to the inside of longitudinal support members 6A, 6B of the detachable body support structure 1.

The securing mechanism 12 according to these implementations includes first 18A and second 18B clamp arms rotatably mounted to an elongated frame 20. The clamp arms 18A, 18B are shown engaged with the body support structure 1 in a clamping configuration so as to selectively and securely clamp the body support structure 1 and an attached detachable body to the hoist 10.

Figure 13:
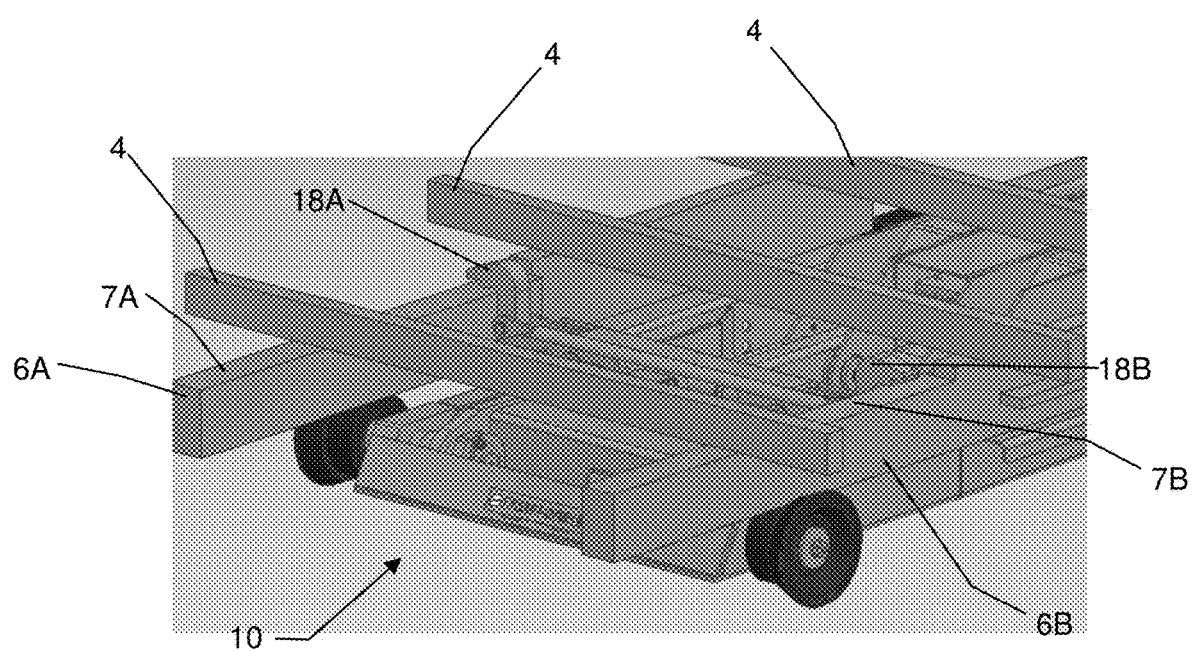
FIGS. 13-15 are partial perspective views and FIG. 16 is a partial end view of the support structure, hook-lift hoist, and detachable body securing mechanism of FIGS. 11-12 with the detachable body securing mechanism in a clamping configuration according to an embodiment.
Figure 14:
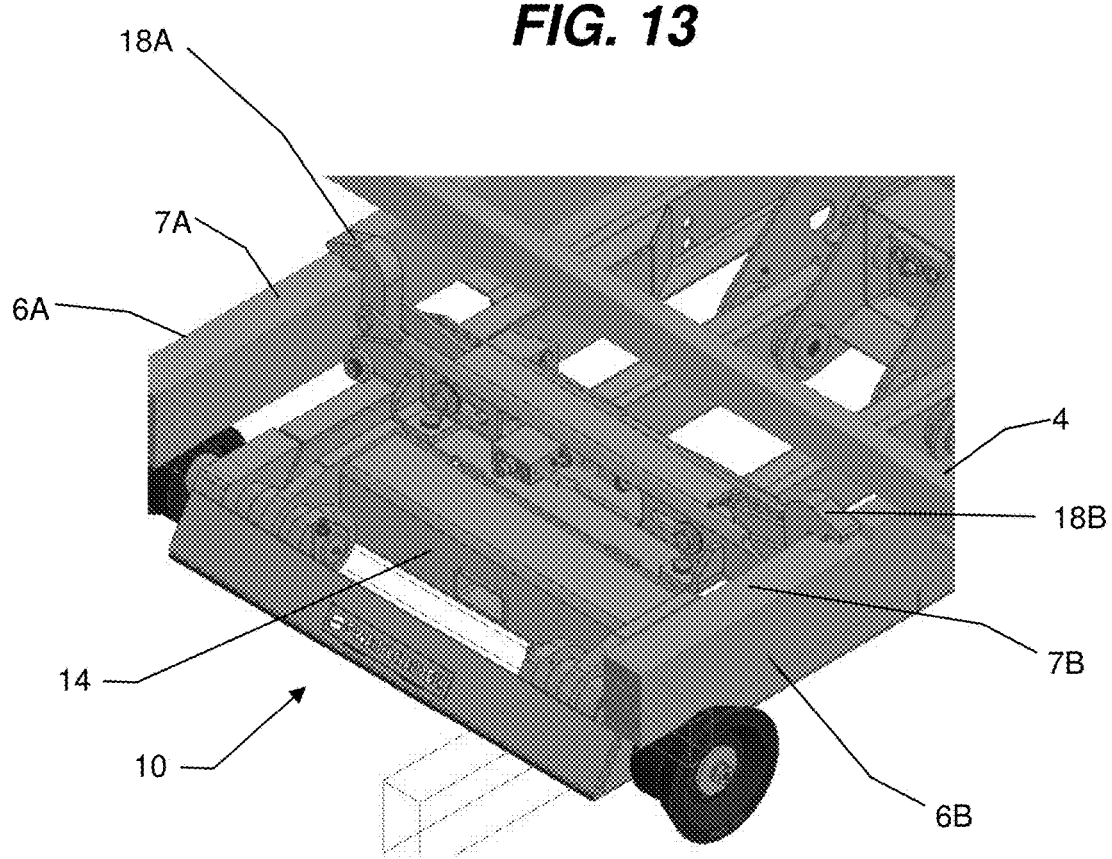
Figure 15:
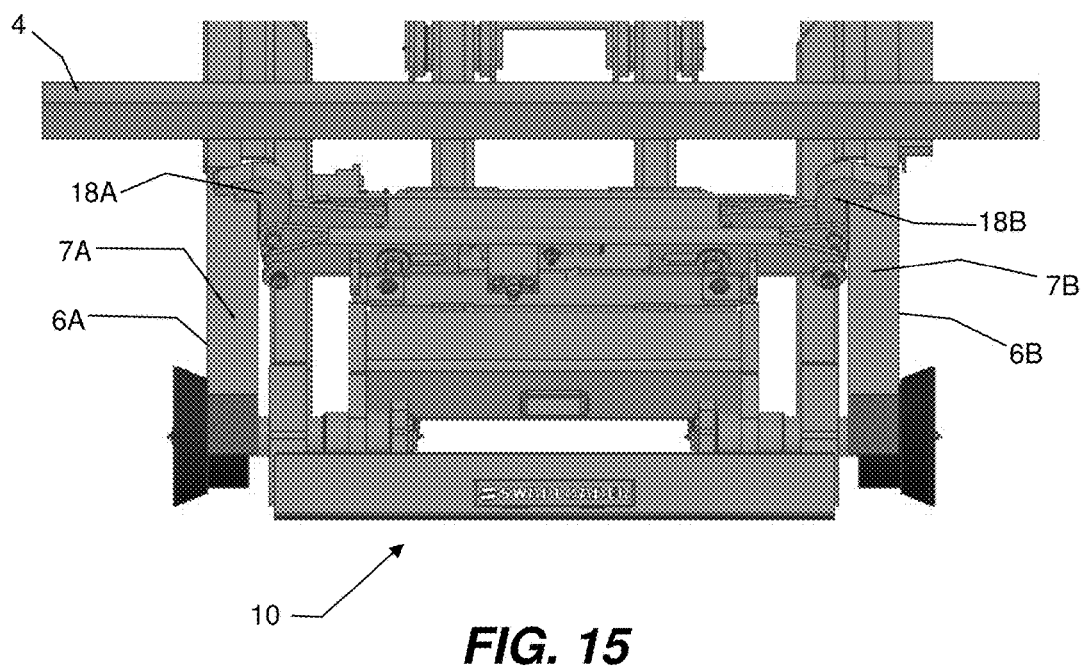
Figure 16:
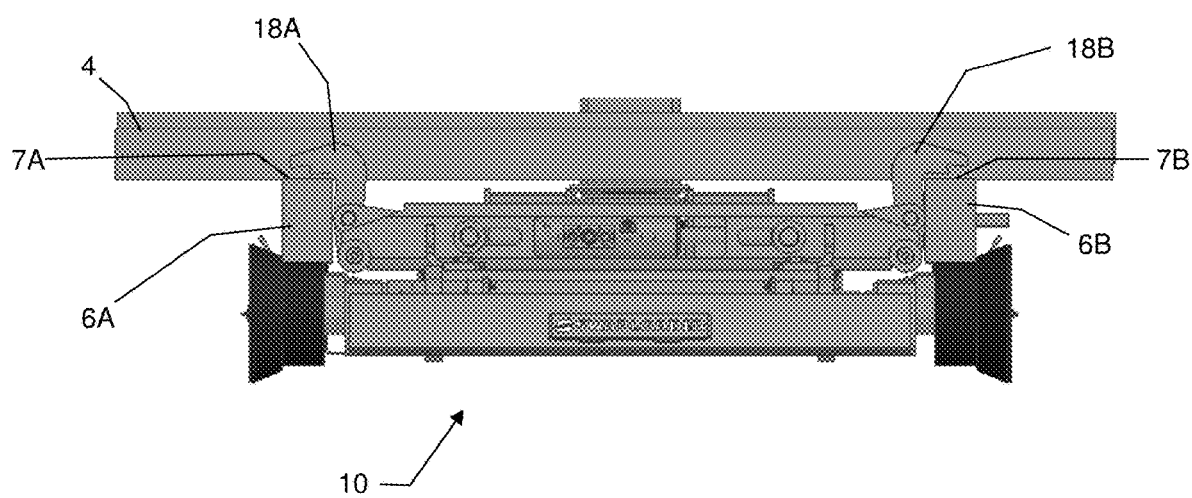

In the depicted implementation, the detachable body support structure 1 includes first and second longitudinal support members 6A, 6B (also shown in, for example, the implementation of FIG. 13) that extend underneath and support multiple elongated cross support members 4. In use, the cross-support members 4 would normally be attached to the bottom of a detachable body 1. As an example, in some cases the cross-support members 4 are cross sills extending across the width of the detachable body 1 and the longitudinal support members 6A, 6B are spaced apart longsills extending along the length of the detachable body 1. Further configurations are of course possible.

As depicted in FIG. 1, the first 18A and second 18B clamp arms are configured to rotate away from each other, away from the elongated frame 20, and toward the inside of each corresponding longitudinal support member 6A, 6B. In the clamping configuration, the first clamp arm 18A clamps down against the top surface of one longitudinal support member 6A and the second clamp arm 18B clamps down against the top surface of the other longitudinal support member 6B so as to secure the detachable body support structure 1 in position relative to the hoist 10. As will be discussed further herein, in certain implementations the clamp arms 18A, 18B are also configured to rotate away from the insides of the longitudinal support members 6A, 6B toward the elongated frame into a retracted configuration. Once in the retracted configuration, the detachable body support structure 1 is no longer clamped against the hoist and can be unloaded from the hook-lift hoist 10, as would be readily appreciated.

FIGS. 2-6 are various detailed views of the detachable body securing mechanism 12 of FIG. 1 in a retracted configuration according to certain implementations. FIGS. 7-10 are views of the securing mechanism 12 in a clamping configuration according to certain implementations. As shown in FIGS. 2, 3, 7, and 8, the detachable body securing mechanism 12 includes an elongated frame 20 and first 18A and second 18B clamp arms rotatably coupled to respective first 22A and second 22B ends of the frame 20. The frame 20 in this example includes elongated top 24, bottom 26, and side 28A, 28B walls that define an interior space or cavity 30 within the frame 20. Turning to FIGS. 4-6 and 9-10, the securing mechanism 12 is depicted without the elongated frame 20 to provide a clearer view of various components located within the interior space or cavity 30 created by the frame 20.

Figure 2:
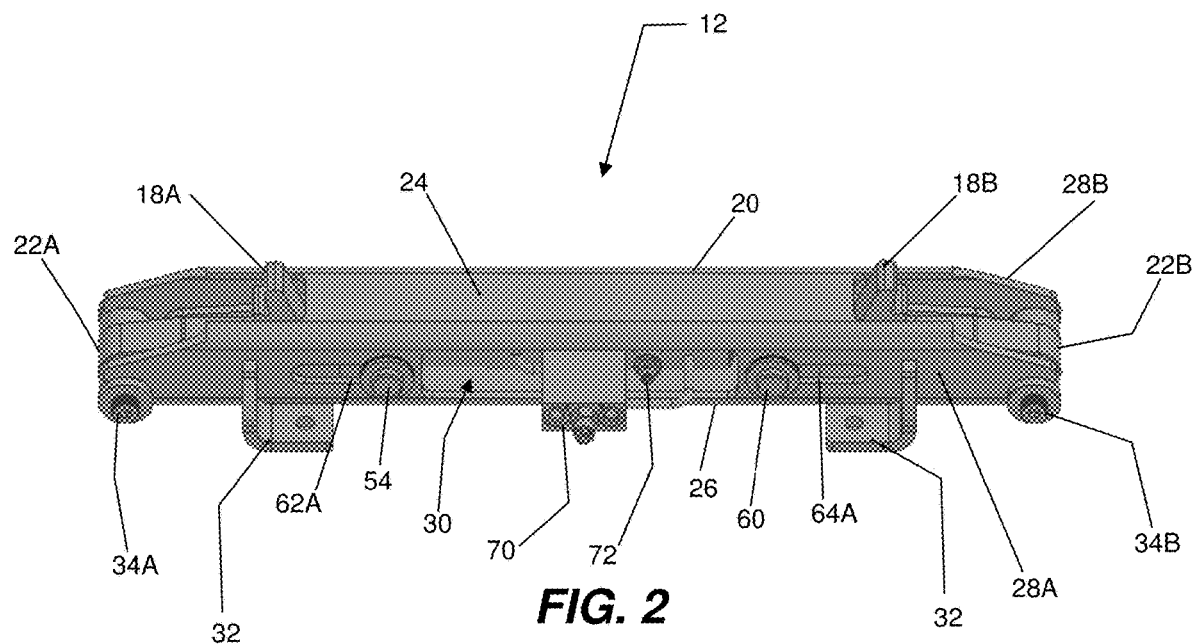
FIGS. 2 and 3 are perspective and side views, respectively, of a detachable body securing mechanism in a retracted configuration according to an embodiment.
Figure 3:
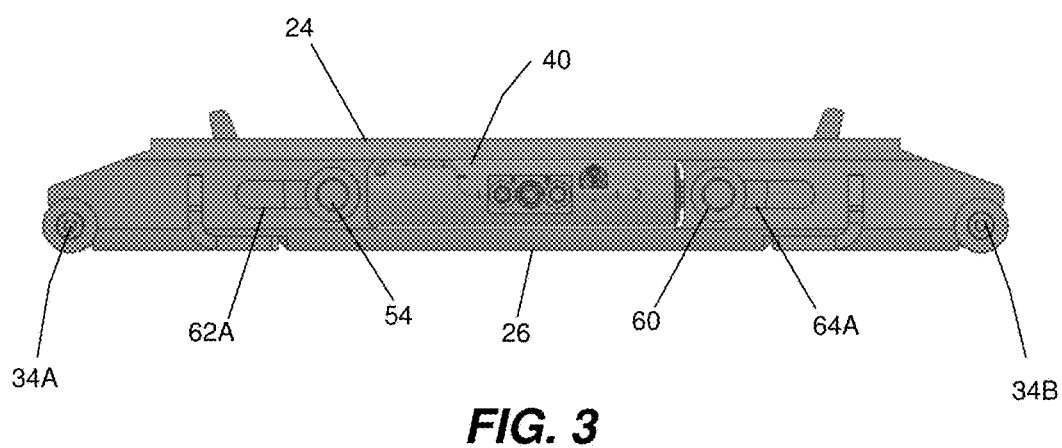
Figure 4:
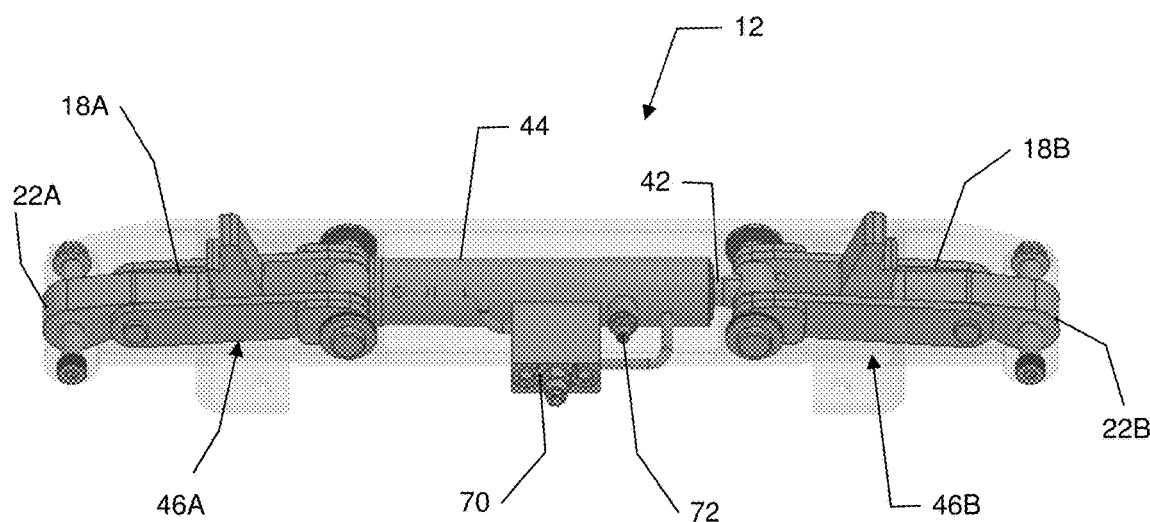
FIGS. 4-6 are perspective, side and top views, respectively, showing internal components of the detachable body securing mechanism of FIG. 2.
Figure 5:
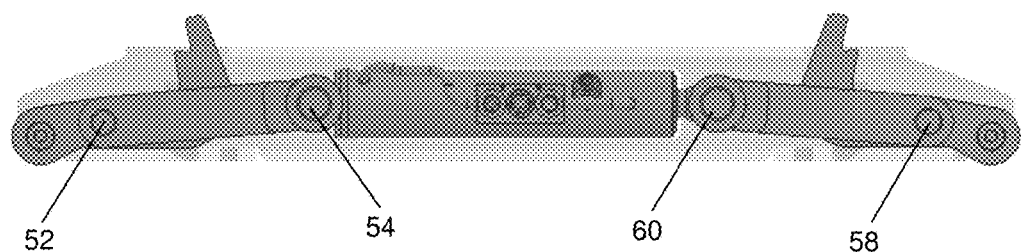
Figure 6:
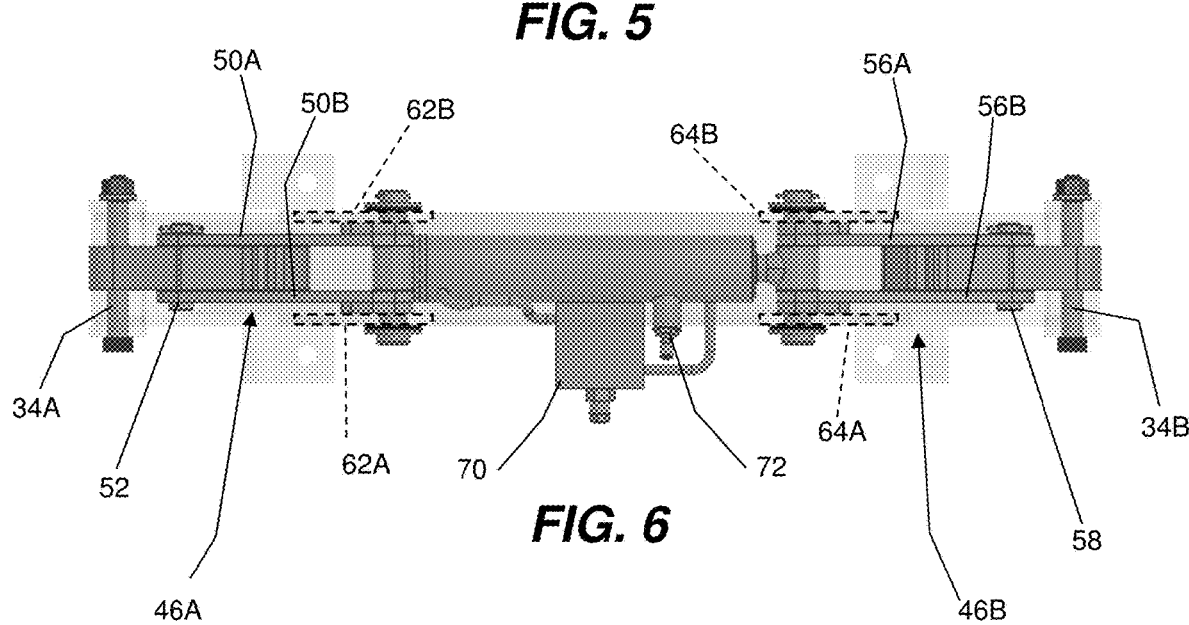
Figure 7:
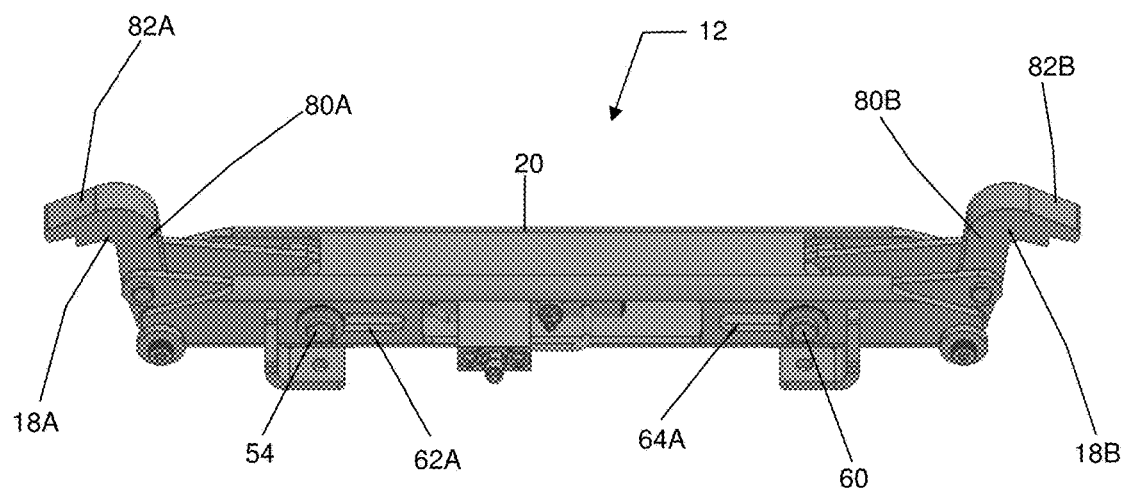
FIGS. 7 and 8 are perspective and side views, respectively, of the detachable body securing mechanism of FIG. 2 in a clamping configuration according to an embodiment.
Figure 8:
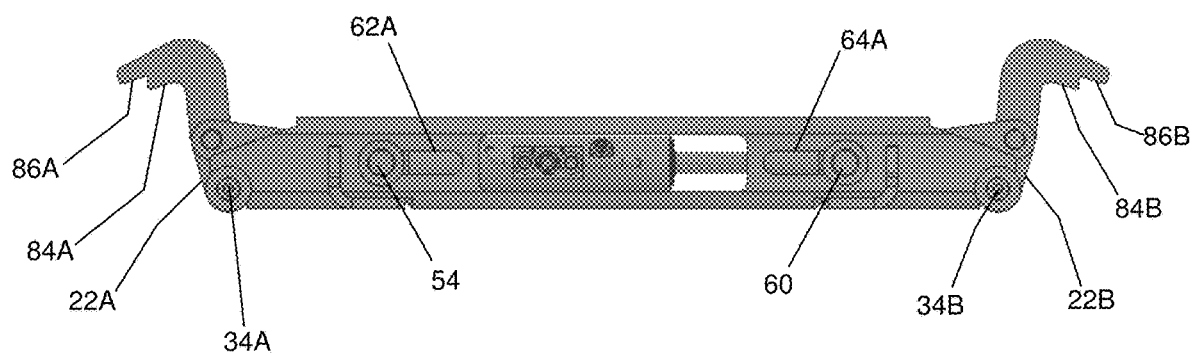
Figure 9:
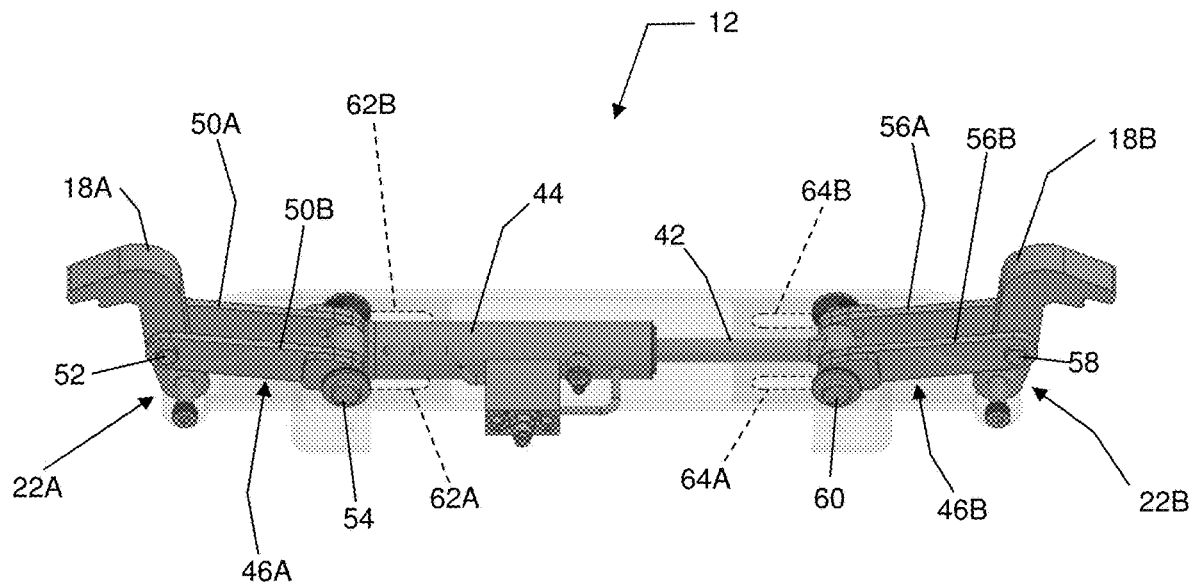
FIGS. 9 and 10 are perspective and side views, respectively, showing internal components of the detachable body securing mechanism of FIG. 7 in the clamping configuration.
Figure 10:
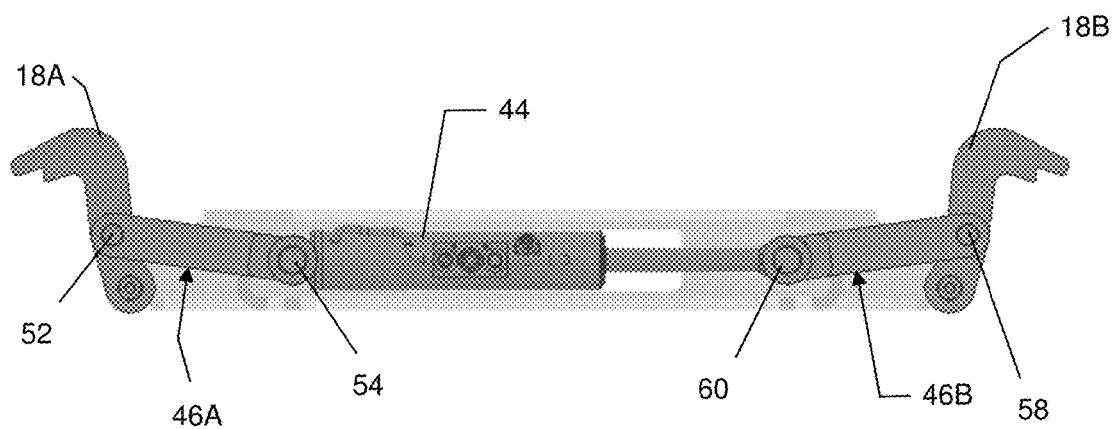

FIGS. 2 and 3 are perspective and side views, respectively, of the securing mechanism 12 in the retracted configuration, and FIGS. 7 and 8 are perspective and side views, respectively, of the securing mechanism 12 in the clamping configuration according to certain implementations. FIGS. 4-6 are perspective, side and top views, respectively, showing internal components of the detachable body securing mechanism 12 in the retracted configuration. FIGS. 9-10 are perspective and side views, respectively, that show internal components of the detachable body securing mechanism 12 in the clamped configuration. As will be appreciated from the drawings, the elongated frame 20 includes multiple mounting flanges 32 that in this case allow the securing mechanism 12 to be secured to the support structure of a hoist, such as the hoist support structure 14 shown in FIG. 1. For example, in some implementations the frame 20 may be secured by bolts, welding, or any other suitable fastening technique. As with the example shown in FIG. 1, the securing mechanism 12 can be attached across the width of a hoist support structure so that the elongated configuration of the frame 20 positions the first and second arm clamps 18A, 18B proximate the inside of respective longitudinal support beams (e.g., longsills) forming part of a detachable body understructure.

The first and second clamp arms 18A, 18B are rotatably coupled to the first and second ends 22A, 22B of the frame 20 with first and second end pins 34A, 34B, respectively. The clamp arms 18A, 18B are rotatably coupled to opposite ends of an actuable piston 40 that includes a piston 42 slidingly coupled with a piston body 44. In this example, the actuable piston 40 is positioned within the interior 30 of the elongated frame 20. Actuation of the piston 42 toward and away from the piston body 44 generally moves the first and second clamp arms 18A, 18B between the clamping configuration shown in FIGS. 7-10 and the retracted configuration shown in FIGS. 2-6. In the examples shown in the drawings and further described herein, the actuable piston 40 is a hydraulic cylinder. In certain implementations the actuable piston may instead be a pneumatic or electrically actuated piston, or another type of actuation mechanism understood by those of skill in the art.

In certain implementations, the actuable piston 40, e.g., hydraulic cylinder is indirectly coupled to the first and second clamp arms 18A, 18B through one or more coupling links. As shown in the figures, in this example a first coupling link 46A is rotatably coupled between the first clamp arm 18A and an end of the cylinder body 44. A second coupling link 46B is rotatably coupled between the piston 42 of the hydraulic cylinder 40 and the second clamp arm 18B. In the depicted example, the first and second coupling links 46A, 46B are formed by pairs of coupling bars rotatably mounted to the clamp arms and the hydraulic cylinder with pins. With reference to FIGS. 4-6 and 9-10, the first coupling link 46A includes first and second coupling bars 50A, 50B that are coupled to the first clamp arm 18A with a first arm pin 52 and to the hydraulic cylinder body 44 with a first cylinder pin 54. Likewise, the second coupling link 46B includes third and fourth coupling bars 56A, 56B that are coupled to the second clamp arm 18B with a second arm pin 58 and to the hydraulic cylinder piston 42 with a second cylinder pin 60. In the example shown in the figures, the first and second coupling links 46A, 46B are rotatably coupled at identically corresponding locations along the first and second clamp arms 18A, 18B, respectively.

In this implementation, the side walls of the elongated frame 20 are slotted in order to guide movement of the rotatably coupled components. As will be appreciated from FIGS. 2, 3, and 6-9, the cylinder pins 54, 60 coupling the hydraulic cylinder 40 to the first and second coupling links 46A, 46B extend through slots in the sidewalls 28A, 28B of the frame. In the depicted implementation the first cylinder pin 54 extends through a first pair of slots 62A, 62B formed in the side walls 28A, 28B, respectively. The second cylinder pin 60 extends through a second pair of slots 64A, 64B formed in the side walls 28A, 28B, respectively. FIGS. 2, 3, 7, and 8 illustrate first slots 62A, 64A of each pair and FIGS. 6 and 9 illustrate each of the slots 62A, 62B, 64A, 64B in dashed lines. As the hydraulic cylinder 40 extends and retracts, the pairs of slots restrict and guide movement of the end of the cylinder body 44 coupled to the first coupling link 46A and the end of the piston 42 coupled to the second coupling link 46B. In this example the slots are aligned along a common plane that restricts movement of the cylinder body and piston to a linear path within the plane.

It will be appreciated that the restricted movement of the cylinder 40 in combination with the respective coupling points between the coupling links 46A, 46B and the clamp arms 18A, 18B, respectively, ensure that the hydraulic cylinder 40 acts on each clamp arm. Thus extension of the hydraulic cylinder rotates the first and second clamp arms 18A, 18B away from each other and the elongated frame 20 along corresponding mirrored paths. Similarly, retraction of the hydraulic cylinder 40 rotates the first and second clamp arms 18A, 18B toward each other and the elongated frame 20 along the same paths. In certain implementations the extension and retraction of the hydraulic cylinder rotates the first and second clamp arms in a sequential manner, with one rotating after the other. It is also contemplated that in some cases the arms may rotate at the same time.

In certain implementations a detachable body securing mechanism may also include a load holding valve and/or a proximity sensor. In the example shown in FIGS. 2-10, a loading holding valve 70 is incorporated into the hydraulic cylinder 40. As will be appreciated, the load holding valve 70 can prevent actuation of the hydraulic cylinder 40 in the event of a hose failure, thus ensuring that the securing mechanism 12 continues clamping and securing a detachable body during a hydraulic pressure failure. In some cases the load holding valve 70 is also configured to lock movement of the hydraulic cylinder 40 when the hydraulic system is disabled, such as during transportation.

In certain implementations a proximity sensor 72 can be used to determine the extension/retraction state of the cylinder 40 and thus also the clamping/retraction state of the securing mechanism 12. For example, the proximity sensor 72 shown in the figures can be electrically coupled to an indicator light on a control dashboard. The sensor 72 can be configured to turn on the indicator light when, for example, the sensor detects that the securing mechanism is in the clamping configuration. The sensor and indicator light can thus inform an operator that the securing mechanism 12 is engaged or disengaged, e.g., before a person operates the hoist. In certain implementations, the proximity sensor 72 may be electrically coupled with an electronic drive system for a hoist. In such cases the output of the sensor may be used to lock operation of the hoist drive in particular situations. For example, in some implementations operation of the hoist drive may be disabled unless the output from the sensor indicates that the clamp arms of the securing mechanism are disengaged from the body support structure.

According to certain implementations, rotation of the first and second clamp arms 18A, 18B down upon the top of longitudinal support members allows the securing mechanism 12 to clamp to support members of varying heights and construction, since the clamp arms will simply engage taller support members earlier in the arm rotation that shorter support members. Turning to FIGS. 7-10, in the depicted example, each of the first and second clamp arms 18A, 18B has a respective extension portion 80A, 80B and a respective clamp portion 82A, 82B formed at one end of the respective extension portion. The opposite ends of the extension portions 80A, 80B are rotatably mounted to the first and second ends 22A, 22B, respectively, of the frame 20 with the first and second end pins 34A, 34B. As shown in the figures, the clamp arms 18A, 18B are coupled to the frame 20 so that the clamp portions 82A, 82B extend out and away from the frame 20 and from each other in the clamping configuration. This orientation allows the clamping arms 18A, 18B to engage the tops of longitudinal support members from the inside of the support members.

In certain implementations the configuration of the clamp arms 18A, 18B themselves may also accommodate multiple support member heights. As perhaps best seen in FIG. 8, the clamp arms 18A, 18B in this example have multiple clamp surfaces. In addition to a first clamp surface 84A, 84B, a second clamp surface 86A, 86B is provided on each arm 18A, 18B that enables the arm to engage taller longitudinal support members. While the depicted example illustrates two clamp surfaces, it is contemplated that the clamp portions of the arms can be provided with any suitable number of clamp surfaces of varying heights.

Figure 11:
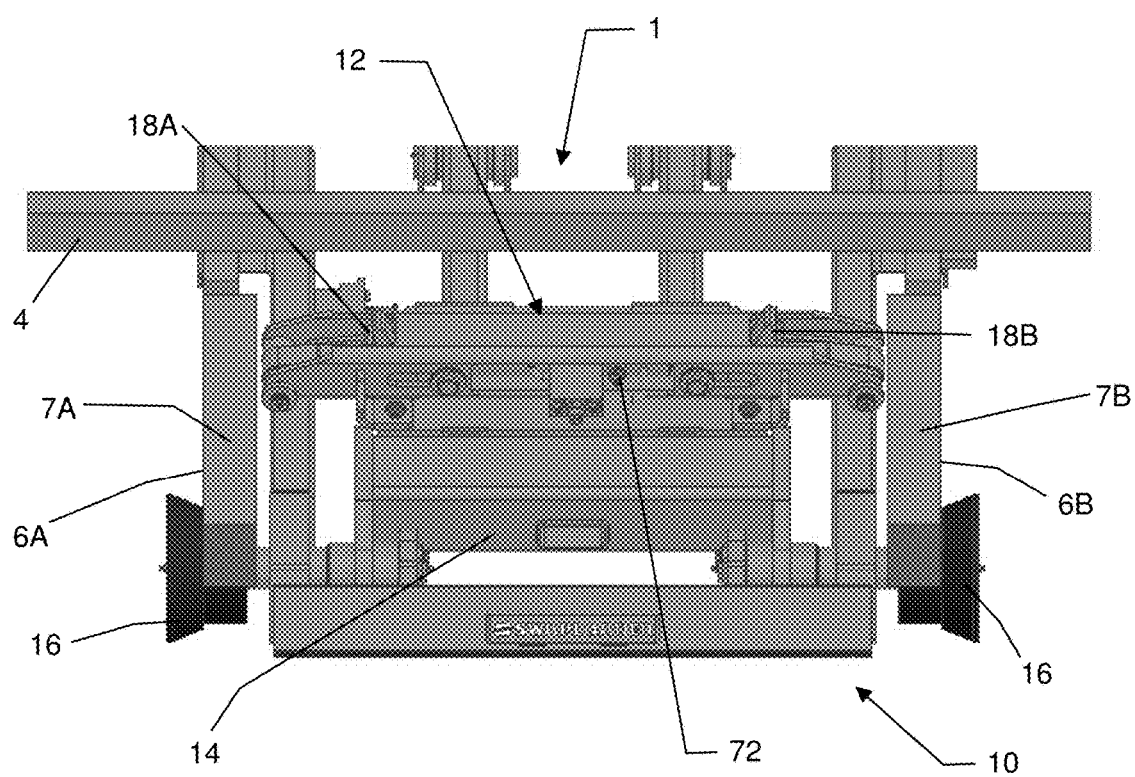
FIGS. 11 and 12 are partial perspective and end views, respectively, of the support structure of a detachable body positioned on a hook-lift hoist with a detachable body securing mechanism in a retracted configuration according to an embodiment.
Figure 12:
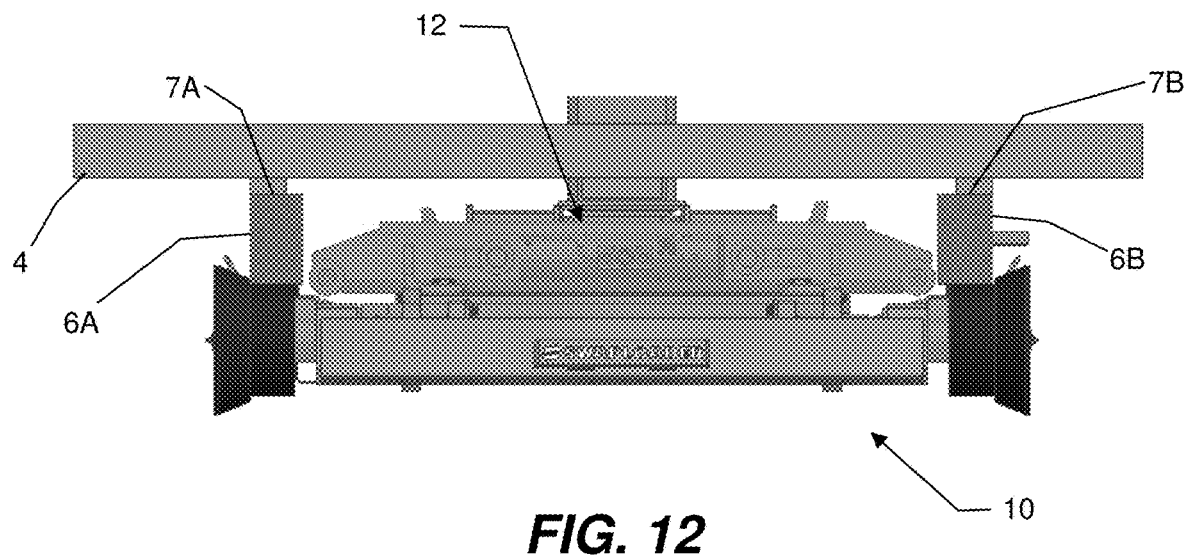

FIGS. 11-16 are various partial views of the detachable body understructure 1 or support structure 1 from FIG. 1 loaded upon the vehicle-mounted hoist 10 in a manner that will be familiar to those skilled in the art. Although only partially depicted, the detachable body structure 1 includes two parallel longitudinal support members 6A, 6B (e.g., longsills) that support multiple elongated cross support members 4 (e.g., cross sills). In this example the vehicle-mounted hoist 10 is a hook-lift hoist, though it should be appreciated that certain implementations may instead be directed to other types of hoists, such as a cable hoist. The hook-lift hoist 10 in this example includes rollers 16 mounted to the hoist structure 14 which supports the detachable body support structure 1. The hoist 10 also includes the detachable body securing mechanism 12 from FIGS. 2-10 mounted to the hoist support structure 14 generally between or to the inside of the rollers 16 and longitudinal support members 6A, 6B positioned on the rollers. In FIGS. 11 and 12, the detachable body securing mechanism 12 is shown in the retracted configuration in which the first and second clamp arms 18A, 18B are not engaged with the detachable body longitudinal support members 6A, 6B. FIGS. 13-16 illustrate various views of the clamping configuration with the first and second clamp arms 18A, 18B clamped against the top surfaces 7A, 7B of respective longitudinal support members 6A, 6B.

The detachable body securing mechanism 12 advantageously enables engaging and disengaging the understructure or sub-frame of a detachable body as part of the loading and offloading a particular detachable body, such as a container or platform-mounted equipment. When loading a detachable body with the hook-lift hoist, the jib (not fully shown in the figures) is retracted and the lift cylinder(s) are extended to rotate the hook back. An operator then checks to ensure that the securing mechanism 12 is disengaged via, for example, an indicator light electrically coupled to the proximity sensor 72. The lift bar is engaged and the lift cylinder(s) are retracted. The jib cylinder is then extended to position the detachable body upon the hoist support structure 14. The securing mechanism 12 is then actuated to rotate the first and second clamping arms 18A, 18B toward the inside of corresponding longitudinal support members and to subsequently clamp the support members down upon the hoist 10 from the top of the support members. Offloading a detachable body involves reversing these steps.

Figure 17:
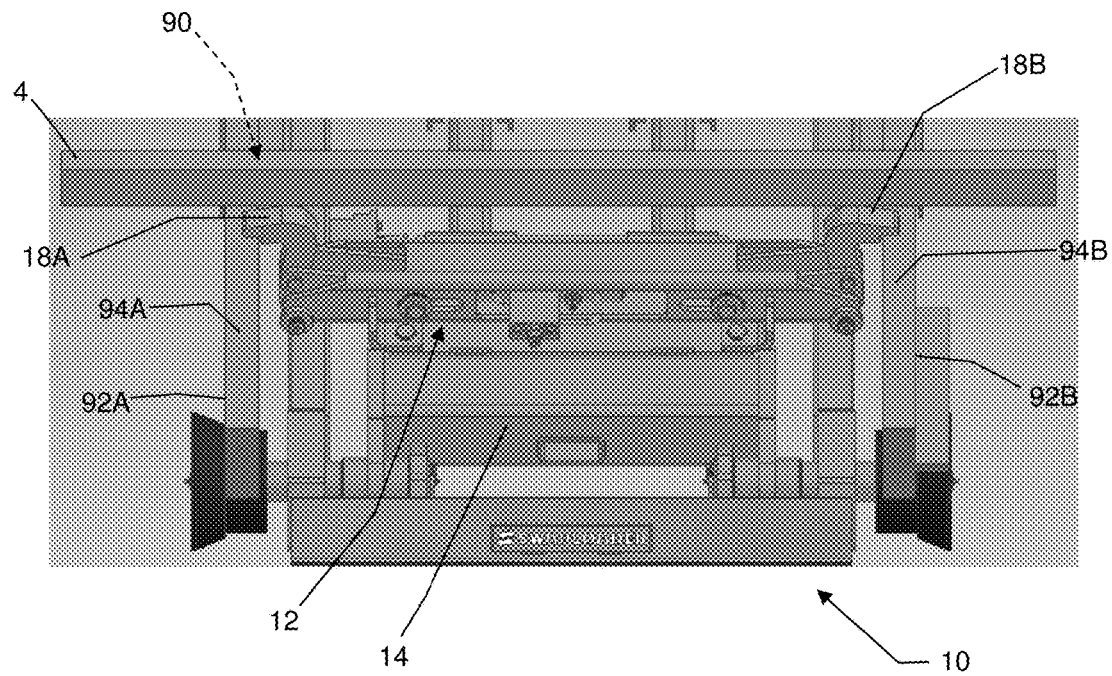
FIGS. 17 and 18 are partial perspective and end views, respectively, of a detachable body positioned on a hook-lift hoist with a detachable body securing mechanism in a clamping configuration according to an embodiment.
Figure 18:
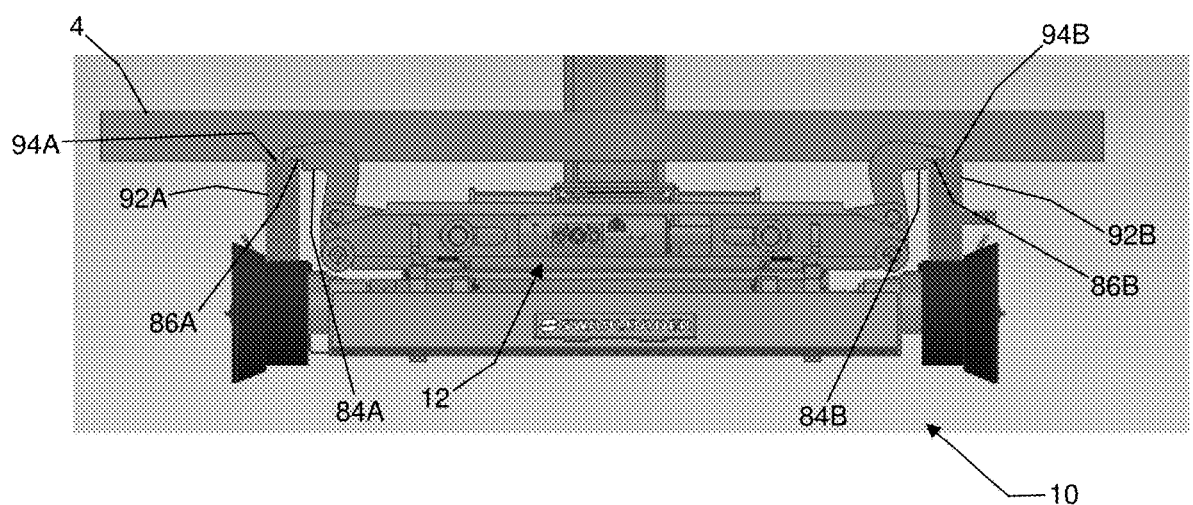

FIGS. 17 and 18 are partial perspective and end views, respectively, of another detachable body support structure 90 positioned on the hook-lift hoist 10 shown in FIGS. 2-10 with the detachable body securing mechanism 12 in a clamping configuration according to various implementations. As will be appreciated, the support structure 90 for the detachable body includes longitudinal support members 92A, 92B with a different height than the support members shown in other implementations herein. The securing mechanism 12 mounted to the hook-lift chassis in this example includes first and second clamp arms 18A, 18B that have multiple clamp surfaces, thus enabling the clamp arms to more readily engage and clamp down upon the longitudinal support members. As an example, in FIGS. 11-16 the first clamp surfaces 84A, 84B of the first and second arms 18A, 18B are able to engage the top surfaces 7A, 7B of the longitudinal support members 6A, 6B. As shown in FIGS. 17 and 18, second clamp surfaces 86A, 86B are positioned relatively higher on the clamp arms 18A, 18B than the first clamp surfaces 84A, 84B. The second clamp surfaces 86A, 86B are thus able to engage the top surfaces 94A, 94B of the longitudinal support members 92A, 92B, which are relatively taller than the longitudinal support members 6A, 6B shown in FIGS. 11-16. Operation of the securing mechanism 12 is otherwise similar to other examples described herein.

Although the various embodiments have been described with reference to preferred implementations, persons skilled in the art will recognize that changes may be made in form and detail without departing from the spirit and scope thereof.

What is claimed is:

1. A detachable body securing mechanism, comprising:
   a) an elongated frame comprising a first end and a second end configured to attachment to a vehicle mounted hoist;
   b) a first clamp arm rotatably coupled to the first end of the elongated frame, the first clamp arm having at least two clamp surfaces at different heights;
   c) a second clamp arm rotatably coupled to the second end of the elongated frame, the second clamp arm having at least two clamp surfaces at different heights; and
   d) an actuable piston comprising a piston body coupled to the first clamp arm and a piston coupled to the second clamp arm,
   wherein:
   i) extension of the piston rotates the first and second clamp arms away from each other and the elongated frame into a clamping configuration for securing a detachable body wherein one of the at least two clamp surfaces engages with the detachable body; and
   ii) retraction of the piston rotates the first and second clamp arms toward each other and the elongated frame into a retracted configuration for releasing the detachable body.

2. The detachable body securing mechanism of claim 1, wherein the detachable body comprises an understructure comprising spaced apart first and second longitudinal support members, wherein in the clamping configuration the first clamp arm is configured to clamp against a top surface of the first longitudinal support member and the second clamp arm is configured to clamp against a top surface of the second longitudinal support member.

3. The detachable body securing mechanism of claim 2, wherein the first clamp arm is configured to rotate into the clamping configuration by rotating toward the first longitudinal support member and away from the second longitudinal support member, and wherein the second clamp arm is configured to rotate into the clamping configuration by rotating toward the second longitudinal support member and away from the first longitudinal support member.

4. The detachable body securing mechanism of claim 1, further comprising a first coupling link rotatably coupled between the first clamp arm and the piston body and a second coupling link rotatably coupled between the piston and the second clamp arm.

5. The detachable body securing mechanism of claim 1, wherein the actuable piston comprises a load holding valve.

6. The detachable body securing mechanism of claim 1, wherein the actuable piston comprises a proximity sensor.

7. The detachable body securing mechanism of claim 1, wherein the actuable piston comprises a hydraulic cylinder comprising a piston and a cylinder body.

8. A vehicle-mounted hoist comprising the detachable body securing mechanism of claim 1.

9. The vehicle-mounted hoist of claim 8, further comprising at least two rollers mounted to a hoist support structure, wherein the detachable body securing mechanism is mounted to the hoist support structure to the inside of the at least two rollers.

10. A detachable body securing system, comprising:
    a vehicle mounted hoist;
    an elongated frame attached to the vehicle mounted hoist;
    a first clamp arm rotatably coupled to the elongated frame comprising a first clamp surface at a first height and a second clamp surface at a second height wherein the first height is greater than the second height;
    a second clamp arm rotatably coupled to the elongated frame comprising a third clamp surface at a third height and a fourth clamp surface at a fourth height wherein the third height is greater than the fourth height; and
    an actuable piston having a first end and a second end wherein the first end is rotatably couple to the first clamp arm and the second end is rotatably coupled to the second clamp arm,
    wherein:
    extension of the actuable piston rotates the first and second clamp arms away from each other and the elongated frame into a clamping configuration for securing a detachable body; and
    retraction of the actuable piston rotates the first and second clamp arms toward each other and the elongated frame into a retracted configuration for releasing the detachable body.

* * * * *